Nov. 24, 1942.  W. D. SWALLOW  2,302,983
RECIPROCATING MOTOR
Filed Feb. 12, 1941  2 Sheets-Sheet 1

INVENTOR,
William Duncan Swallow.
BY Roy E. Hamilton,
ATTORNEY.

Nov. 24, 1942.  W. D. SWALLOW  2,302,983
RECIPROCATING MOTOR
Filed Feb. 12, 1941  2 Sheets-Sheet 2

INVENTOR,
William Duncan Swallow
BY Roy E. Hamilton,
ATTORNEY.

Patented Nov. 24, 1942

2,302,983

UNITED STATES PATENT OFFICE

2,302,983
RECIPROCATING MOTOR

William Duncan Swallow, Kansas City, Mo., assignor of twenty-six and two-thirds per cent to George S. Pelton and Herbert E. Pelton, both of Los Angeles, Calif.

Application February 12, 1941, Serial No. 378,512

8 Claims. (Cl. 172—126)

This invention relates to improvements in electric reciprocating motors wherein a large current carrying conductor is employed.

The principal object of the present invention is the provision of an electric reciprocating motor provided with a field magnet having interdigitated pole pieces and an armature winding adapted for reciprocation between the digits of said pole pieces.

A further object of this invention is the provision of an electric reciprocating motor having a field magnet with inter-positioned toothed pole pieces with an armature winding carried by a resilient member positioned in zig-zag form for reciprocation between the toothed pole pieces.

Another object of the invention is the provision of an electric reciprocating motor wherein the air gap between the pole pieces is reduced to a minimum and the distance between the pole pieces and the armature winding is substantially constant and uniform.

Other objects are the production of an electric reciprocating motor of simple and sturdy construction, one in which power is applied to the vibratory member through the full working cycle of the alternating driving current, and one which will produce higher amplitude of vibration than is now obtainable with motors now available.

With these objects as well as other which will appear during the course of the specification, in view, reference will now be had to the drawings wherein.

Figure 1:
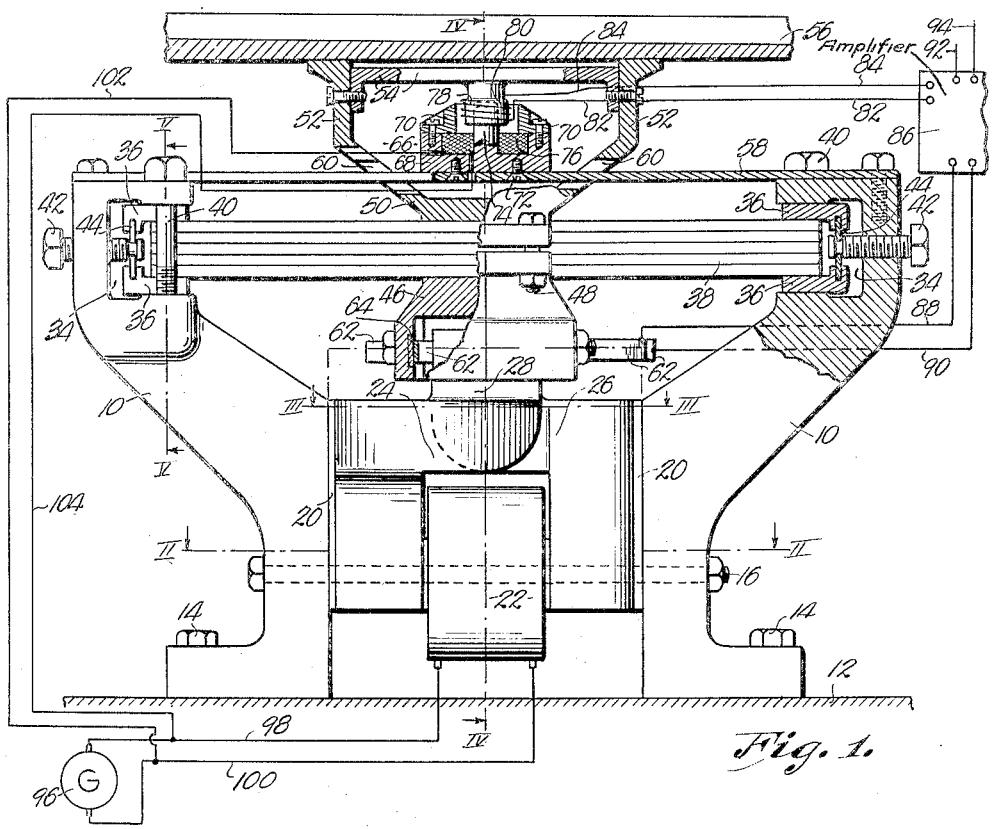
Figure 1 is an elevational view partly broken away of an electric reciprocating motor embodying the invention.

Throughout the several views like reference characters refer to similar parts and the numeral 10 designates spaced apart frame pieces securely anchored to a base 12 by means of bolts 14 and joined together by means of bolts 16 which also secures a field magnet 18 therebetween. Insulators 20 space the field magnet from frame pieces 10 and the conventional coil 22 is wound about the body of the magnet. The pole pieces 24 and 26 are provided with fingers or digits 28 and 30 respectively which are in regular spaced apart or interdigitated relation as clearly shown in Figures 2 and 4. The upwardly extending portions of the field pole fingers are substantially rectangular in cross section while that portion 32 of said fingers adjacent the body of the field magnet are wedge-shape in cross section as clearly shown. When thus constructed and positioned the interdigitated field pole, rectangular, finger portions will create a high magnetic field therebetween while the distances between the wedge-shaped portion 32 will be greater thus eliminating to a large degree possible magnetic dissipation.

Frame members 10 are each inwardly slotted at 34 to receive clamping blocks 36 to receive the respective end portions of the laminated spring member 38 therebetween. The screws 40 mounted in frames 10 at each side of blocks 36 and spring members 38 maintain them against lateral movement and also when screwed down tightly serve to clampingly engage the spring parts to hold them in a pre-determined position. The frequency of vibration of this spring member may be varied by changing its effective length. This is accomplished by moving the block relative to the frame members by means of adjusting screws 42 which engage a plate 44, which joins together blocks 36. The screws 40 are first loosened then the adjusting screws 42 are adjusted to obtain proper positioning of the blocks relative to spring 38 then the screws 40 are again tightened.

The spring 38 carries at its center portion a non-ferrous armature frame 46 which is secured by bolts 48 to the non-ferrous member 50 having upwardly extending arms 52 joined together by brace 54, and supporting a suitable table 56 thereabove, to receive materials to be vibrated.

Figure 2:
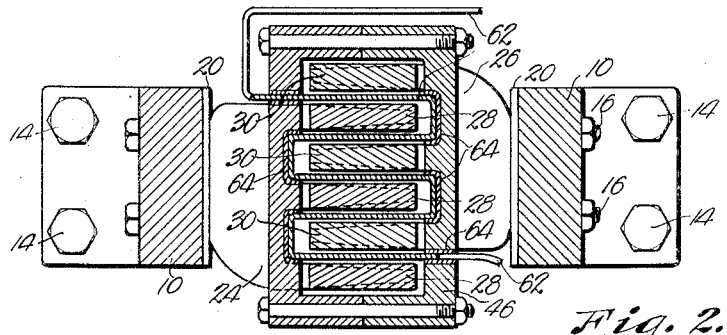
Fig. 2 is a horizontal sectional view taken on line II—II of Fig. 1.
Figure 3:
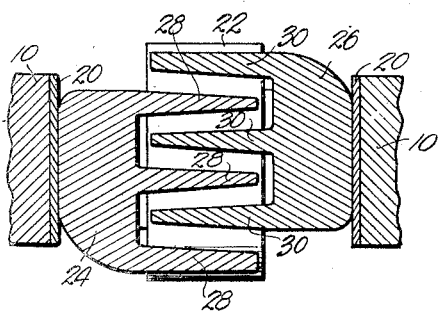
Fig. 3 is a fragmentary, horizontal sectional view taken on line III—III of Fig. 1.

A bar 58 secured at its opposite ends to members 10 extends through openings 60 formed through arms 52. An armature winding 62 carried by frame 46 and insulated therefrom by means of insulators 64 is adapted to reciprocate between the interdigitated pole pieces 24 and 26. Referring to Fig. 2 it will be noted that this armature winding is in zig-zag form and is of sufficient size to hold its form so that it can be closely spaced between the pole digits where the magnetic field is strongest thereby producing a very efficient current. Only a single winding of the armature coil is shown, however it is quite apparent that a plurality of windings might be employed without changing the general operation of the device. This heavy current carrying conductor 62 positioned as shown makes it possible to maintain proper spacing of the conductor and pole pieces without separating the interdigitated members beyond practical limits and at the same time presents a sufficiently rigid structure to maintain the parts in properly related operating positions at all times. This type of zig-zag conductor also permits of rapid cooling to increase its current carrying capacity over a like conductor found in the conventional coil form.

Figure 4:
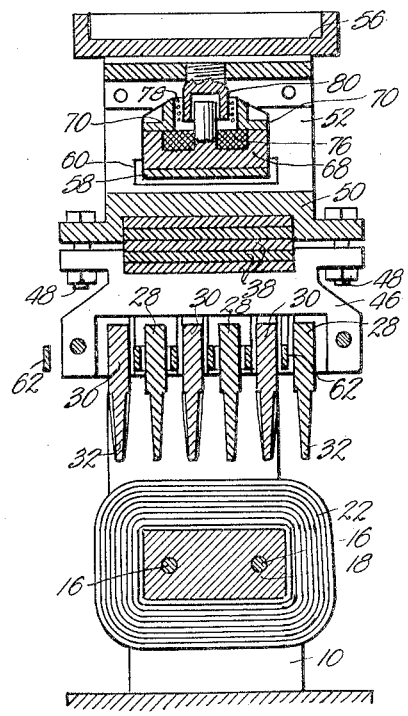
Fig. 4 is a vertical sectional view taken on line IV—IV of Fig. 1.
Figure 5:
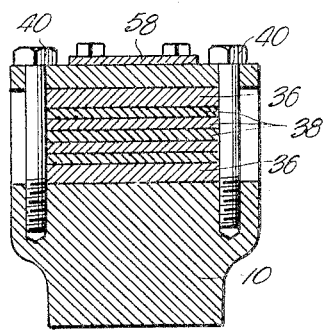
Fig. 5 is a sectional view taken on line V—V of Fig. 1.

Reference will now be had to Figs. 1 and 4 wherein the generator 66 is clearly shown. The field member 68 having pole pieces 70 is securely mounted on cross bar 58 by means of screws 72 and has a central pole piece 74 extending between the spaced apart pole pieces 70 and carries a field coil 76 which serves to strengthen the magnetic field between the poles in which the coil 78 carried by the hollow, depending, non-magnetic core 80 is adapted to oscillate with the oscillating member 38. The alternating current set up in coil 76 is conducted by wires 82 and 84 to the amplifiers 86, the output of which is conducted to armature winding 62 by wires 88 and 90. When thus connected the frequency of alternation of the current will be in step with the frequency of vibration of member 38. By adjusting screws 42 the effective length of spring member 38 can be varied thereby varying the frequency of vibration of the table 56. Unit 86 is a conventional audio frequency amplifier and is connected to any suitable source of current through conductors 92 and 94 which provide the current for amplification.

Any desired current can thus be fed to the driving coil 62 for obtaining the desired amplitude of vibration of spring 38 and its connected parts.

Since the frequency of current from generator 66 controls the frequency of the current fed to the driving coil 62, regardless of any change in vibration of table 56, due to change of load or for any other reason, the driving current is always in phase with the table 56.

Variable resistance means to control the amount of current to the driving coil may be provided to determine the amplitude of vibration of the table.

Direct current is furnished to coil 22 by generator 96 through wires 98 and 100, and to the coil 68 by wires 102 and 104 which join respectively with wires 100 and 98. In some instances permanent magnets might be used instead of the electromagnets shown.

This type of electromagnetic generator produces a current of sufficient strength to permit the use of a low gain amplifier in the power circuit thereby producing a more economic device by eliminating some of the stages of amplification.

Since it is not necessary to the operation of this motor to use the feed back in all cases, and particularly at low frequencies, it is found convenient to tune the frequency of vibration of the spring by means of the adjusting screws 42 to conform to the current frequency of the power line.

What I claim and desire to cover by Letters Patent is:

1. In an electric reciprocating motor a field magnet having spaced-apart interdigitated pole pieces and resilient means of relatively hard material carrying an armature winding for reciprocation between the digits of said pole pieces and a nonferrous member interposed between said resilient means and said armature winding.

2. In an electric reciprocating motor a field magnet having inter-positioned toothed pole pieces, an armature winding carried by a ferrous resilient member and spaced apart therefrom by a non-ferrous member and disposed between the interpositioned teeth for reciprocating relation thereto.

3. In an electric reciprocating motor a frame, a field magnet carried by said frame having spaced apart interdigitated pole pieces, a ferrous resilient member carried by said frame, a non-ferrous member carried by said resilient member and an armature winding carried by said non-ferrous member for vibrating movement between the interdigitated pole pieces.

4. In an electric reciprocating motor a frame, a field magnet having interdigitated pole pieces, carried by said frame, an elongated vibratory member anchored at its opposite ends to said frame, an armature winding spaced between said interdigitated pole pieces carried by said vibratory member adjacent its center portion and spaced therefrom by a non-ferrous member.

5. In an electric reciprocating motor a frame, a field magnet having interdigitated pole pieces, carried by said frame, an elongated vibratory member adjustably anchored at its opposite ends to said frame, and an undulated armature winding carried by said vibratory member with a non-ferrous member therebetween for oscillation between said pole pieces.

6. In an electric reciprocating motor a frame, a field magnet having interdigitated pole pieces, carried by said frame, the outer end portions of the digits of said pole pieces being relatively closer together than their inner portions thereof, an elongated vibratory member adjustably anchored at its opposite ends to said frame, and an armature winding carried by said vibratory member adjacent its center portion and positioned in zigzag relation between the outer end portions of said digits.

7. In an electric reciprocating motor a frame, a field magnet having interdigitated pole pieces, carried by said frame, an elongated vibratory member anchored at its opposite ends to said frame, a non-ferrous member anchored to the central portions of said vibratory member, an armature winding carried by said non-ferrous member and positioned in zig-zag form to vibrate between said interdigitated pole pieces.

8. In a reactive electric reciprocating motor a frame, a field magnet having interdigitated pole pieces, each digit of said poles being rectangular in form and having depending a relatively thin wedge-shaped rib by means of which it is joined to the body of the field magnet, an elongated laminated vibratory member secured at its opposite ends to said frame carrying an armature winding disposed between the rectangular portions of said digits.

WILLIAM DUNCAN SWALLOW.